United States Patent
Daouse

(10) Patent No.: US 6,193,494 B1
(45) Date of Patent: Feb. 27, 2001

(54) APPARATUS FOR MANUFACTURING FROZEN PLASTIC COMPOSITION MASSES CONTAINING GEL PIECES

(75) Inventor: Alain Daouse, Noailles (FR)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 08/871,014

(22) Filed: Jun. 6, 1997

(30) Foreign Application Priority Data

Jun. 7, 1996 (EP) .................................................. 96201596

(51) Int. Cl.[7] .................................................. B29C 47/04
(52) U.S. Cl. ..................... 425/133.1; 425/382.3; 425/462
(58) Field of Search ................................ 425/131.1, 132, 425/133.1, 382.3, 462; 426/516

(56) References Cited

U.S. PATENT DOCUMENTS

| | | |
|---|---|---|
| 2,190,226 | 2/1940 | Alexander . |
| 2,246,871 | 6/1941 | Balch . |
| 2,313,060 | 3/1943 | Friedman . |
| 2,479,261 | 8/1949 | Reetz . |
| 2,646,757 | 7/1953 | Hackmann . |
| 2,669,946 * | 2/1954 | Peyton ............................. 425/131.1 |
| 2,722,177 | 11/1955 | Routh . |
| 2,774,314 | 12/1956 | Moser . |
| 2,816,518 * | 12/1957 | Daggett ............................. 425/131.1 |
| 3,014,437 | 12/1961 | Dutchess . |
| 3,147,717 * | 9/1964 | Smith ................................ 425/131.1 |
| 3,181,838 | 5/1965 | Johansen . |
| 3,477,393 | 11/1969 | Bell et al. . |
| 3,671,268 | 6/1972 | Blake et al. . |
| 3,830,407 | 8/1974 | Wierlo . |
| 4,332,145 | 6/1982 | Yuhasz et al. ........................ 62/342 |
| 4,332,541 * | 6/1982 | Anders ............................. 425/382.3 |
| 4,447,458 | 5/1984 | Roth et al. ........................... 426/275 |
| 5,820,913 | 10/1998 | Grassler et al. ..................... 426/564 |

FOREIGN PATENT DOCUMENTS

| | | |
|---|---|---|
| 5909190 | 3/1991 | (AU) . |
| 3521612A1 | 9/1986 | (DE) . |
| 1360757 | 4/1964 | (FR) . |

* cited by examiner

*Primary Examiner*—Harold Pyon
*Assistant Examiner*—Joseph Leyson
(74) *Attorney, Agent, or Firm*—Vogt & O'Donnell, LLP

(57) ABSTRACT

Apparatus which provides a cylindrical chamber in which is contained a tool which is provided with a rotating movement for cutting up an extrudate delivered into the chamber into pieces and so that the pieces are distributed into a frozen composition mass delivered into the chamber and so that the mixture obtained is extruded through to a nozzle for passage of a composite mixture from the chamber.

23 Claims, 2 Drawing Sheets

APPARATUS FOR MANUFACTURING FROZEN PLASTIC COMPOSITION MASSES CONTAINING GEL PIECES

BACKGROUND OF THE INVENTION

The present invention relates to manufacture of food compositions with a plastic mass, particularly a plastic frozen composition mass, into which another composition is introduced, particularly to obtain a composite food composition wherein the other composition is in a form of pieces, and more particularly, the present invention relates to apparatus for manufacture of such composite compositions by means which include extrusion apparatus and techniques.

It is known how to incorporate and uniformly distribute pieces, for example pieces of comfit or dried fruits, in a mass of frozen composition, for filling pots or trays in the manufacture of family or bulk portions. For example, a device as described in German Patent Application Publication No. 35 21 612 makes it possible to distribute already-formed pieces of a certain size uniformly in a vein of ice cream from a hopper with the aid of a rotating drum with retractable blades pressing against a cylindrical wall, the function of which is to load a constant quantity of pieces into a sector of the drum and to distribute them uniformly in the stream of ice cream.

In U.S. Pat. No. 3,014,437 different masses of plastic products such as ice cream masses with different flavors are co-extruded, and the extrudate obtained is twisted by imparting a rotating movement with the aid of a rotating blade having a "butterfly" form. One of the plastic products may be a fondant.

SUMMARY OF THE INVENTION

An object of the present invention is to meter an edible gel into a mass of a plastic composition, particularly a frozen composition, and obtain a composite plastic mass and gel composition wherein the gel is in a form of pieces distributed in a random manner in the mass.

To that end, the present invention provides a process for manufacturing composite compositions characterized in that a gel extrudate and plastic substance composition, particularly a plastic frozen composition, are delivered into a member which provides a chamber so that the chamber contains a mass of the plastic composition, and the gel extrudate delivered into the chamber is cut into pieces and the pieces are distributed in a random manner in the plastic composition mass continuously and in a single operation.

The present invention also provides apparatus for carrying out the process which includes a member which provides a cylindrical chamber in which is contained a tool which is provided with a rotating movement for cutting up the gel extrudate into pieces and with means for deflecting the mass longitudinally with respect to the axis of the chamber and which includes a nozzle through which the composite composition is extruded from the chamber.

DETAILED DESCRIPTION OF THE INVENTION

According to the present invention, "frozen composition" means an ice cream, a sorbet or a sherbet, which is aerated or expanded to a variable extent.

Also within the context of the present invention, a gel is an aqueous composition containing sugar, polysaccharide gelling agents, such as, for example, carob gum or carrageenans and optionally flavors and colorants, for example fruit flavors and colorants.

The gel employed in the context of the present invention is prepared hot, for example at 60–80° C., from a mixture of water, sugar, polysaccharide gelling agents and optionally colorants and flavors, and this mixture is then pumped through a pipe and cooled to around 10–15° C, so that it can still be pumped.

In a particular embodiment of the invention, such as by means of an assembly comprising co-axial tubes, the gel is formed as a hollowed extrudate, and a second composition which has different Theological properties from those of the gel and which, at low temperature, is harder than the gel, and which may be, for example, a fondant, a sweetened paste or a fatty material, for example chocolate, is introduced and metered into the hollow of the gel extrudate at a higher temperature than that of the gel, for example at around 40–60° C. In this way, it is possible to produce a sheath of gel surrounding a vein of hard composition, which may be incorporated directly into the mass of frozen composition. Without this sheath, it would not be possible to introduce the second composition, since such a composition would rapidly solidify and obstruct the supply tube in contact with the cold mass of frozen composition. Once cut up, the two-component extrusion pieces have a form of, for example, rings which provide a decorative appearance.

Outlines other than circular are of course included within the term "ring", in as much as the outline is dictated by the configuration of the nozzle at the end of the pipe supplying the gel. This outline may define, for example, a slit, a polygon, such as a rectangle, a square, a triangle, a star, or may define an oval, or a figurine.

An embodiment of an apparatus for carrying out the process of the present invention comprises a cylindrical member which provides a chamber for the mixing of the plastic frozen composition and the gel composition, at least one tube for delivering the frozen composition to and discharging it into the chamber laterally with respect to the longitudinal axis of the chamber, at least one tube for delivering the gel composition to and for discharging it into the chamber laterally with respect to the longitudinal axis of the chamber and having a cross-section smaller than that of the tube which delivers the frozen composition, a tool which is provided with a rotating movement and which matches the inner wall of the mixing chamber for cutting up the gel supplied into pieces and for distributing the pieces in the frozen composition, means for deflecting the substance mixture of frozen composition and gel pieces longitudinally with respect to the longitudinal axis of the chamber and a nozzle for extruding the substance mixture of the frozen composition containing gel pieces from the chamber.

According to a particular embodiment of the present invention, the tool for cutting up the gel extrudate is a cylindrical lantern which is defined by spaced-apart members which have cutting edges and which, in turn, define and provide open space therebetween, i.e., lantern "windows", and which, upon lantern rotation, "match" the inner wall of the chamber to provide for the cutting of the gel extrudate.

In an embodiment, the apparatus is extended downstream from the lantern cutting tool and mixing chamber by at least one further chamber and ends in the outlet nozzle. Preferably, supplementary supply tubes for the frozen composition are arranged laterally downstream from the cutting tool.

Preferably, in the extended embodiment, further means for distributing the pieces is provided by elements arranged about the periphery of a further chamber along its inner wall. These elements ensure a random distribution of the pieces of gel by preventing these pieces from being distributed in a heap in the mass of frozen composition.

The invention is described further, by way of example, with reference to the accompanying drawing Figures.

BRIEF DESCRIPTION OF THE DRAWING FIGURES

Figure 1:
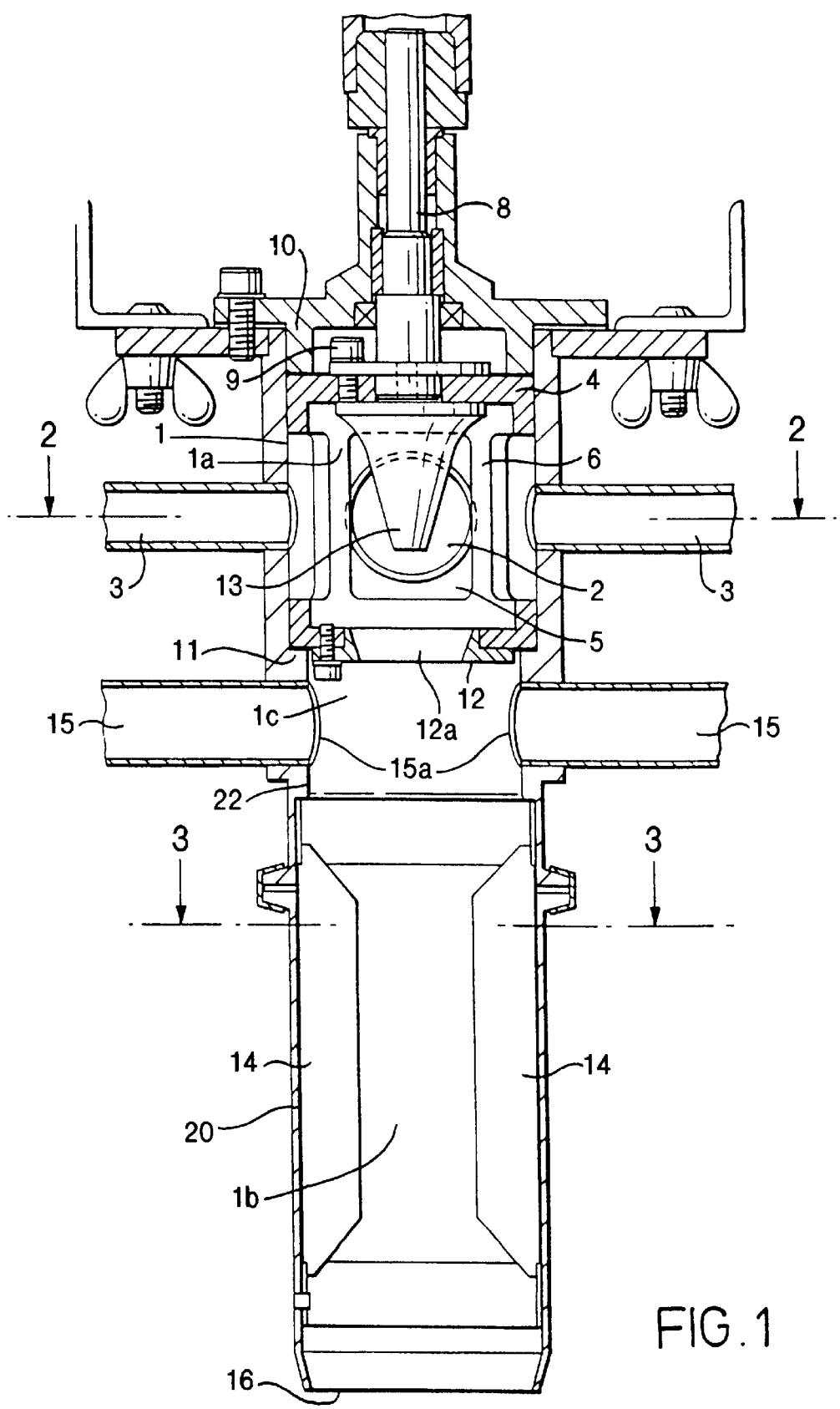
FIG. 1 illustrates a longitudinal section an embodiment of the device of the present invention.
Figure 4:
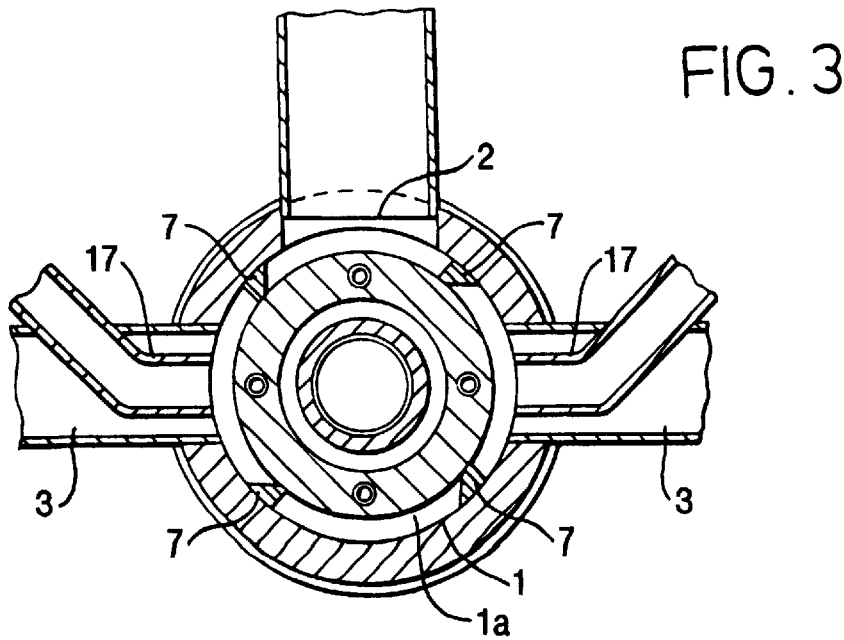

FIG. 4 further illustrates the section designated by section line 2—2 of FIG. 1.

DETAILED DESCRIPTION OF THE DRAWING FIGURES

Figure 2:
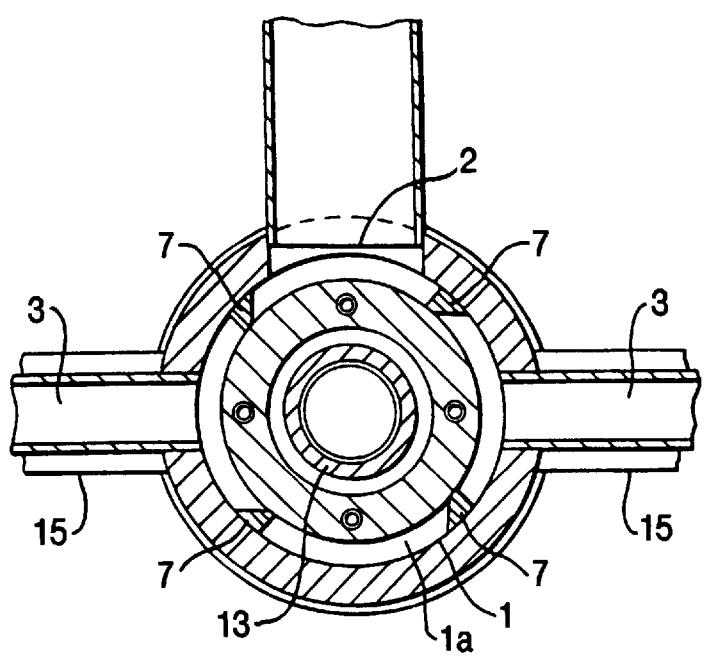
FIG. 2 illustrates the section designated by section line 2—2 of FIG. 1.
Figure 3:
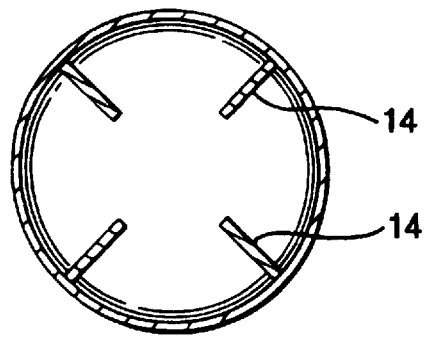
FIG. 3 illustrates the section designated by section line 3—3 of FIG. 1.

As shown in the drawing Figures, and particularly in FIG. 1, an embodiment of the apparatus comprises cylindrical members which define a plurality of chambers 1a, 1b and 1c which extend longitudinally one from the other and which include a wall surface 1 which defines a mixing chamber portion 1a. In operation, a frozen composition is delivered through the opening 2, for example at a temperature of around −5° C. to −7° C, by means of a pump (not shown). A gel, cooled to around 15° C., is delivered from each side to the chamber 1a by the tubes 3. A lantern 4 is provided with large windows 5 which are defined and separated by the vertical cutting tool members 6 which have cutting edges 7 (see FIGS. 2 and 4).

In operation, the lantern 4 is rotated by means of the shaft 8, to which it is attached by the bolts 9, by a variable speed motor (not shown) and rotates between the bearings 10 and 11. Frozen composition and pieces of gel distributed therein are deflected under the effect of the deflector 13, which as illustrated in FIG. 1, has a form of a truncated cone, towards the member 12, which is integrated with an outlet opening of the lantern tool 4 so that it is suitable for passage of the longitudinally directed substance mixture from the tool 4. Member 12 is configured so that it defines an opening 12a at a position beneath the outlet opening of the lantern tool 4 for passage of the longitudinally directed substance mixture passed from the outlet passage opening of tool member 4 and from the chamber 1a. The substance mixture passage member opening 12a has, as illustrated, a truncated cone shape and is positioned so that the substance mixture from the tool member passage opening is passed to the base of the truncated cone shape, and the truncated cone shape passage opening has a longitudinal axis in common with that of the chamber 1a. As also illustrated in FIG. 1, the passage opening 12a has a cross-section size which is smaller than a cross-section size of chamber 1a.

As also illustrated in FIG. 1, the substance mixture passes from substance mixture passage member opening 12a to and through another portion of the apparatus defined by a member having cylindrical wall surface 22 which is connected with an apparatus portion defined by a member having cylindrical wall surface 20 which defines the chamber 1b and having elements 14 which are arranged at and extend from the periphery of the member wall surface 20. The elements 14 function as a static mixer for distributing the stream of frozen composition containing the pieces of gel.

As also shown in FIG. 1, tubes 15, which deliver substance via the openings 15a, are arranged laterally with respect to the longitudinal extent of the wall surface 22 which defines the chamber 1c and serve to supply supplementary streams of frozen composition. Further as shown in FIG. 1, the downstream portion of the apparatus terminates at the outlet nozzle 16 for the mixture of frozen composition containing the pieces of gel.

As shown in FIG. 4, the tubes 3, which deliver gel, contain the pipes 17, which are coaxial with and have a smaller cross-section than the gel supply tubes 3. The tubes 3 and pipes 17 enable composite veins of gel containing a center, for example chocolate, to be introduced into the device by co-extrusion. The sheaths of gel ensure thermal insulation of the center vein which enables a composite extrudate to be conveyed to the chamber without the risk of obstructing the supply tubes 3.

In further detail, as illustrated by the drawing Figures, the apparatus of the present invention includes a member having a cylindrical surface 1 which circumscribes a chamber 1a and which is configured to define, within its longitudinal extent, first and second openings for delivering substances from outside of the chamber laterally into the chamber and wherein the second opening has a cross-section size which is smaller than a cross-section size of the first opening. (FIG. 1). A first tube 2 (FIGS. 1, 2 and 4) and a second tube 3 are connected to and extend from the member so that the first and second tubes are connected, respectively, with the first opening and second opening in the member which provides cylindrical surface 1 for delivering differing substances to and through the openings and into the chamber for preparing a composite food product. More particularly, the first tube and first opening described above and by the drawing Figures have a cross-section size and are suitable for delivering a frozen confectionery composition to and through the first opening and into the chamber, and the second tube and second opening described above and by the drawing Figures have a cross-section size and are suitable for delivering a food gel to and through the second opening and into the chamber for preparing a composite substance mixture comprising a frozen composition mass in which a food gel may be distributed.

To effect obtaining gel pieces for distribution and incorporation into the composition mass, the apparatus includes a tool 4 which is positioned in the chamber 1a and which comprises a plurality of vertical longitudinally extending members 6 having cutting edges 7 and which defines a tool outlet passage opening. The tool is rotatable and the cutting edges are suitable for cutting through the substances delivered into the chamber from the openings and are positioned so that, upon tool rotation, the cutting edges pass circumferentially about the chamber longitudinal axis for obtaining a substance mixture in the chamber, and the tool outlet passage is suitable for passing the substance mixture away from the tool and from the chamber 1a.

Thus, in the context of a frozen composition and a gel extrudate, the apparatus provides for cutting through a frozen confectionery composition mass and a food gel passed into the chamber from the openings so that the gel is cut into and distributed as pieces into the frozen confectionery composition mass. Additionally, means, illustrated as deflector 13 (FIG. 1), is positioned in the chamber for deflecting the substance mixture for directing passage of the mixture longitudinally through the chamber, and in the afore-described extended embodiment, a substance mixture member 12 is connected with the member, tool for passage of the longitudinally-directed mixture from the tool outlet opening and the chamber 1a.

What is claimed is:

1. Apparatus for preparing a composite food product including a frozen composition mass and comprising:
   a member which comprises a cylindrical surface which circumscribes a chamber having a longitudinal axis and which is configured to define, within its longitudinal extent, first and second openings for delivering substances from outside of the chamber laterally into the chamber wherein the second opening has a cross-section size which is smaller than a cross-section size of the first opening;
   a first tube and a second tube connected, respectively, with the first opening and second opening for delivering differing substances to and through the openings and into the chamber wherein the first tube and first opening have a size and are suitable for delivering a frozen composition to and through the first opening and into the chamber and wherein the second tube and second opening have a size and are suitable for delivering a food gel to and through the second opening and into the chamber for preparing a composite composition mixture comprising a frozen composition mass in which a food gel is distributed;
   a tool positioned in the chamber which comprises cutting edges and which defines a tool outlet passage opening and wherein the tool is rotatable and the cutting edges are positioned so that, upon tool rotation, the cutting edges pass circumferentially about the chamber longitudinal axis and wherein the cutting edges are positioned and suitable for cutting through a frozen composition mass and through a food gel delivered into the chamber from the openings so that the gel is cut into and distributed as pieces in the frozen composition mass for obtaining a substance mixture and wherein the tool outlet passage is suitable for passing the substance mixture away from the tool and from the chamber;
   means positioned in the chamber for deflecting the substance mixture for directing passage of the mixture longitudinally through the chamber and to the tool outlet passage opening; and
   a nozzle positioned for receiving substance mixture passed from the tool outlet passage opening and the chamber.

2. Apparatus according to claim 1 wherein the tool comprises a plurality of members which extend longitudinally in an alignment with the longitudinal extent of the chamber member surface and which each comprise a cutting edge which extends longitudinally in a longitudinal alignment with the chamber member surface for the cutting.

3. Apparatus according to claim 1 wherein the means for deflecting the mixture is a member which has a truncated cone shape.

4. Apparatus according to claim 3 wherein the truncated cone-shaped deflector member extends from a cone base to a truncated apex and is positioned so that the apex is positioned between the base and the tool outlet passage opening.

5. Apparatus according to claim 4 wherein the truncated cone-shaped deflector member has a longitudinal axis which extends between the base and the truncated apex and is positioned so that the cone-shaped deflector longitudinal axis and the chamber longitudinal axis are in common.

6. Apparatus according to claim 1 wherein the apparatus further comprises a member which is integrated with the tool and which defines an opening for passage of the longitudinally-directed substance mixture from the tool outlet opening and from the chamber for passage to the nozzle.

7. Apparatus according to claim 6 wherein the substance mixture passage member opening has a truncated cone shape and is positioned so that the truncated cone base receives the substance mixture from the tool outlet passage opening and so that the truncated cone shape has a longitudinal axis in common with the chamber longitudinal axis and has a cross-section size which is smaller than a cross-section size of the chamber.

8. Apparatus according to claim 1 wherein the chamber member is configured to define, within its longitudinal extent, a third opening for delivering a substance from outside of the chamber into the chamber and wherein the third opening has a cross-section size which is smaller than a cross-section size of the first opening for delivering a substance from outside of the chamber member laterally into the chamber and further comprising a third tube connected to the third opening for delivering a substance to and through the third opening and into the chamber and wherein the third tube and opening have a size and are suitable for delivering a food gel to and into the chamber for preparing the substance mixture.

9. Apparatus according to claim 6 wherein the chamber member, tool and substance mixture passage member comprise a first portion of the apparatus and wherein the apparatus further comprises a second portion which comprises a cylindrical surface which defines a second chamber which extends longitudinally from the first portion for receiving delivery of the substance mixture from the first portion substance mixture outlet passage member opening and so that the first and second chambers have a longitudinal axis in common and wherein the nozzle extends from the second portion for delivery of the substance mixture passed through the second portion chamber.

10. Apparatus according to claim 9 further comprising elements positioned in the second portion chamber configured for statically mixing the substance mixture passed through the second portion chamber.

11. Apparatus according to claim 9 wherein the apparatus further comprises a third portion which comprises a member having a cylindrical surface which is positioned between the first and second portions and which defines a third chamber and so that the first, second and third chambers have a common longitudinal axis and wherein the longitudinal extent of the third portion member is configured to define an opening for delivering a substance from outside the third portion chamber laterally into the third portion chamber.

12. Apparatus according to claim 11 further comprising elements positioned in the second portion chamber configured for statically mixing the substance mixture passed through the second portion chamber.

13. Apparatus according to claim 1 further comprising a pipe connected with the second tube for delivering a further substance through the second opening into the chamber and so that upon delivery into the chamber, a sheath of the food gel surrounds the further substance.

14. Apparatus for preparing a composite food product including a frozen composition mass and comprising:
   a member which comprises first and second portions wherein each portion comprises a member having a cylindrical surface which circumscribes a chamber and wherein the first and second portion chamber have a common longitudinal axis and wherein the first portion is configured to define, within its longitudinal extent, first and second openings for delivering substances from outside of the first portion chamber laterally into the first portion chamber and wherein the second opening has a cross-section size which is smaller than a cross-section size of the first opening;

a first tube and a second tube connected, respectively, with the first opening and second opening for delivering differing substances to and through the openings and into the first portion chamber wherein the first tube and first opening have a size and are suitable for delivering a frozen composition to and through the first opening and into the first portion chamber and wherein the second tube and second opening have a size and are suitable for delivering a food gel to and through the second openings and into the first portion chamber for preparing a composition mixture comprising a frozen composition mass in which a food gel is distributed;

a tool positioned in the first portion chamber which comprises cutting edges and which defines a tool outlet passage opening wherein the tool is rotatable and the cutting edges are positioned so that, upon tool rotation, the cutting edges pass circumferentially about the common longitudinal axis of the chambers and wherein the cutting edges are positioned and suitable for cutting through a frozen composition mass and through a food gel delivered into the first portion chamber from the openings so that the gel is cut into and distributed as pieces in the frozen confectionery composition mass for obtaining a substance mixture and wherein the tool outlet passage is suitable for passing the substance mixture away from the tool and from the first portion chamber;

means positioned in the first portion chamber for deflecting the substance mixture for directing passage of the mixture longitudinally through the first portion chamber and to the tool outlet passage opening;

a substance mixture passage member which defines an opening and which is integrated with the tool for passage of the longitudinally-directed mixture from the tool outlet passage opening and the first portion chamber;

elements positioned in the second portion chamber configured for statically mixing the substance mixture passed through the second portion chamber for further mixing the substance mixture for obtaining a further mixed product;

a nozzle positioned for delivering the further mixed product from the second portion chamber.

15. Apparatus according to claim 14 wherein the apparatus further comprises a third portion which comprises a member having a cylindrical surface which is positioned between the first and second portions and which defines a third chamber and so that the first, second and third portion chambers have a common longitudinal axis and wherein the longitudinal extent of the third portion member is configured to define an opening for delivering a substance from outside the third portion chamber laterally into the third portion chamber.

16. Apparatus according to claim 14 wherein the tool comprises a plurality of members which extend longitudinally in an alignment with the longitudinal extent
of the first portion member chamber surface and which each comprise a cutting edge which extends longitudinally in a longitudinal alignment with the first portion member chamber surface for the cutting.

17. Apparatus according to claim 14 wherein the means for deflecting the mixture is a member which has a truncated cone shape.

18. Apparatus according to claim 17 wherein the truncated cone-shaped deflector member extends from a cone base to a truncated apex and is positioned so that the apex is positioned between the base and the tool outlet passage opening.

19. Apparatus according to claim 18 wherein the truncated cone-shaped deflector member has a longitudinal axis which extends between the base and the truncated apex and is positioned so that the truncated cone-shaped deflector member longitudinal axis is in common with the first and second portion longitudinal axis.

20. Apparatus according to claim 14 wherein the substance mixture member passage opening has a truncated cone shape and is positioned so that the truncated cone base receives the substance mixture from the tool outlet passage opening and so that the truncated cone shape has a longitudinal axis in common with the common first and second portion longitudinal axis.

21. Apparatus according to claim 20 wherein the substance mixture passage member opening has a cross-section size which is smaller than a cross-section size of the first portion member chamber.

22. Apparatus according to claim 14 wherein the first portion chamber member is configured to define, within its longitudinal extent, a third opening for delivering a substance from outside of the first portion chamber into the first portion chamber and wherein the third opening has a cross-section size which is smaller than a cross-section size of the first opening for delivering a substance from outside of the first portion chamber member into the first portion chamber and further comprising a third tube connected to the third portion opening for delivering a substance to and through the third opening and into the third portion chamber and wherein the third tube and opening have a size and are suitable for delivering a food gel to and into the third portion chamber for preparing the substance mixture.

23. Apparatus according to claim 14 further comprising a pipe connected with the second tube for delivering a further substance through the second opening into the first portion chamber and so that upon delivery into the first portion chamber, a sheath of the food gel surrounds the further substance.

* * * * *